US006952195B2

(12) United States Patent
Arakawa

(10) Patent No.: US 6,952,195 B2
(45) Date of Patent: Oct. 4, 2005

(54) IMAGE DISPLAY DEVICE

(75) Inventor: Satoshi Arakawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 284 days.

(21) Appl. No.: 09/949,861

(22) Filed: Sep. 12, 2001

(65) Prior Publication Data

US 2002/0030660 A1 Mar. 14, 2002

(30) Foreign Application Priority Data

Sep. 12, 2000 (JP) ....................................... 2000-276024

(51) Int. Cl.[7] ............................ G09G 3/36; H04N 5/58; H04N 5/74

(52) U.S. Cl. ......................... 345/102; 345/87; 348/602; 348/758

(58) Field of Search .................. 345/87, 102; 348/602, 348/758

(56) References Cited

U.S. PATENT DOCUMENTS 4,193,095 A * 3/1980 Mizushima ................. 348/800
5,315,695 A * 5/1994 Saito et al. ................. 345/102
5,406,305 A * 4/1995 Shimomura et al. ........ 345/102
5,751,261 A * 5/1998 Zavracky et al. ............. 345/55
5,764,291 A * 6/1998 Fullam ........................ 348/362
5,786,801 A * 7/1998 Ichise ......................... 345/102
5,796,382 A * 8/1998 Beeteson .................... 345/102
5,831,693 A * 11/1998 McCartney et al. .......... 349/42
5,835,173 A * 11/1998 Inbar et al. ................... 349/61
6,011,528 A * 1/2000 Inbar et al. ................... 345/77
6,144,359 A * 11/2000 Grave ......................... 345/102
6,337,675 B1 * 1/2002 Toffolo et al. ................ 345/77
6,417,833 B1 * 7/2002 Takemoto ................... 345/102

* cited by examiner

*Primary Examiner*—Regina Liang
*Assistant Examiner*—Duc Q Dinh
(74) *Attorney, Agent, or Firm*—Sughrue, Mion, Zinn, MacPeak & Seas, PLLC

(57) ABSTRACT

The image display device includes a liquid crystal display device having a liquid crystal panel and a backlight and a backlight controller for allowing the backlight of the liquid crystal display device to be bright when environment light is bright and allowing the backlight to be dark when the environment light is dark such that light leak (minimum luminance) which is defined by an extinction ratio of liquid crystal will not grow more than a specified degree. The image display device enables displayed images to be really discernible regardless of brightness of environment light (surrounding light).

10 Claims, 3 Drawing Sheets

IMAGE DISPLAY DEVICE

BACKGROUND OF THE INVENTION

The present invention relates to an image display device, more specifically, to an image display device utilizing a liquid crystal display device capable of adjusting luminance of a backlight thereof in response to brightness of environment light (surrounding light), thus rendering a displayed image discernible.

In the field of medical services, various types of diagnostic image-acquiring apparatuses utilizing X-rays and the like have been conventionally put into practical use, for example, an X-ray photographic apparatus, a computed radiographic (CR) apparatus, a computed tomographic (CT) apparatus, a magnetic resonance imaging (MRI) apparatus and the like.

Medical image information acquired with these apparatuses is used in medical sites for the purpose of diagnosis and the like, by means of the information being recorded on photographic films and observed on a film viewer (schaukasten), or being recorded on other recording media and observed on an image display device (a monitor screen) after desired imaging processing such as frequency processing, gradation processing or the like are rendered.

A cathode ray tube (CRT) display device has been conventionally used as the above-described image display device. However, recently, a so-called flat panel display that uses a liquid crystal panel, an organic electro-luminescent (EL) panels or the like is in the process of utilization. This flat panel display generally possesses advantages such as space-saving, light weight, low electric power consumption and the like. Therefore, it is conceivable that the flat panel display will become more widespread in the future.

It should be noted here that a CR (computed radiography) apparatus is a radiographic image recording and reading apparatus using an accumulative fluorescent material (stimulable phosphor) that operate as follows. First, radiation is emitted and a part of radiation energy is accumulated in the accumulative fluorescent material or the stimulable phosphor. Then, excitation light such as visible rays or infrared light is emitted onto the accumulative fluorescent material or the stimulable phosphor, whereby the stimulated luminescence is exhibited according to the radiation energy accumulated therein. In the CR apparatus, first, radiographic image information of a subject, such as a human body, is recorded on the stimulable phosphor by an X-Ray apparatus and the like. Then, the radiographic image information represented by the stimulated luminescence is photoelectrically read to obtain image signals. Then, the thus obtained image signals are subjected to image processing. Finally, the thus processed image signals are output to display a soft copy image on an image display apparatus or to record a hardcopy image on a X-Ray photographic film.

Also, a CT (computed tomography) apparatus is based on a computed tomography method, with which projection images are obtained using parallel X-ray beams on straight lines from various angles and X-ray absorption coefficients of tissues in a human body, which represents the composition of the tissues, are obtained through computation of these data. The thus obtained composition of the tissues is output as a soft copy image or a hardcopy image. The tissue composition is reconstructed from the projection images using, for instance, a successive approximation method or an inverse-projection method, Further, a usual MRI (magnetic resonance imaging) apparatus obtains an electromagnetic wave signal generated by a nuclear magnetic resonance effect of hydrogen atoms and converts the signal into an image. In more detail, an electromagnetic wave at a natural resonance frequency of nuclei is applied from the outside to place a nuclear magnetic moment due to spins in an excitation state. Then, the application of the electromagnetic wave is terminated under this condition to have the nuclei sequentially undergo a transition from the excitation state to a ground state. During this transition, an electromagnetic wave at a resonance frequency is emitted. This electromagnetic wave is received by coils and is converted into an image. The thus converted image is output as a softcopy image or a hardcopy image.

Incidentally, the display device using the above-described liquid crystal panel has a problem that visibility of the displayed images are changed by the outside light or the environment light of the surrounding area, due to the fact that certain light leaks out even if a backlight of the liquid crystal panel is completely turned off (so-called "light leak").

This is the problem that can be regardless when seeing in a bright place, but that it becomes considerably indiscernible when seeing in a dark place to some degree. Specifically, in slightly dark observation circumstances, the light of the liquid crystal panel seems leaking out, thus the contrast of the images thereon are deteriorated.

SUMMARY OF THE INVENTION

The present invention is made in consideration of the above-described circumstances. An object of the present invention is to solve the problem of the prior art, and to provide an image display device utilizing a liquid crystal display device, which enables a displayed image to be really discernible regardless of brightness of environment light (surrounding light).

As a remedy for the above-mentioned problem of the prior art, in principle, the backlight of the liquid crystal panel may be rendered bright when the environment light is bright, whereby the images are rendered discernible by lightening up the low-density part thereof. On the contrary, the backlight of the liquid crystal panel may be rendered dark when the environment light is dark. However, in these cases, it is necessary to consider the light leak that depends on an extinction ratio of the liquid crystal.

The present invention has strongly studied the image display device about the light leak from the screen of the liquid crystal panel in order to achieve the above-described object, thereby having reached the present invention.

In order to achieve the above-described object, the present invention provides an image display device comprising a liquid crystal display device having a liquid crystal panel and a backlight; and a backlight controller for allowing the backlight of the liquid crystal display device to be bright when environment light is bright, and allowing the backlight to be dark when the environment light is dark such that light leak, which is defined by an extinction ratio of liquid crystal, will not grow more than a specified degree.

Preferably, the backlight controller comprises: a first detector for detecting brightness of the environment light; and a brightness controller for controlling brightness of the backlight of the liquid crystal display device, and the backlight controller adjusts the brightness of the backlight corresponding to the brightness of the environment light.

Preferably, the brightness controller comprises; a second detector for detecting a luminance value of the backlight, being provided at the backlight; a device for estimating a first luminance value of the light leak of a liquid crystal screen of the liquid crystal display device, with a preset relation between the luminance value of the backlight and the light leak defined by the extinction ratio of the liquid crystal; and a device for determining a second luminance value accrued by reflection of the liquid crystal screen corresponding to the brightness of the environment light detected by the first detector, based on a predetermined relation between the brightness of the environment light and the second luminance corresponding thereto that is accrued by reflection of the liquid crystal screen; and the brightness controller controls the brightness of the backlight such that a ratio of the first luminance value to the second luminance value is not more than 2.

Preferably, the brightness controller comprises: a device for estimating a first luminance value of the light leak of a liquid crystal screen of the liquid crystal display device from current brightness of the backlight which is estimated based on a predetermined relation between usage time of the backlight and luminance of emission of the backlight and a predetermined relation between a control signal of the backlight and the luminance of the emission of the backlight, with a preset relation between the luminance value of the backlight and the light leak that is defined by the extinction ratio of the liquid crystal; and a device for determining a second luminance value accrued by reflection of the liquid crystal screen corresponding to the brightness of the environment light detected by the first detector, based on a predetermined relation between the brightness of the environment light and the second luminance corresponding thereto that is accrued by reflection of the liquid crystal screen; and the brightness controller controls the brightness of the backlight such that a ratio of the first luminance value to the second luminance value is not more than 2.

Preferably, the brightness controller controls the brightness of the backlight such that the brightness of the backlight is 70% or more of a maximum luminance of the backlight in a range in which the ratio of the first luminance value to the second luminance value is not more than 2.

Preferably, the brightness controller controls the brightness of the backlight such that the first luminance value is equal to or less than the second luminance value.

Preferably, the brightness controller controls the brightness of the backlight such that the brightness of the backlight is 70% or more of a maximum luminance of the backlight in a rage in which the first luminance value is equal to or less than the second luminance value.

It should be noted that in this specification, "environment light" refers to light that exists in an environment where an image display device according to the present invention is disposed. More specifically, it refers to outside light in the environment (this is also referred to as environmental outside light).

Also, "bright" refers to a state that a plenty of light exists in the above-described environment, and "dark" refers to an opposite state thereto. In the case of saying "brightness of a backlight", it is equivalent to "luminance of a backlight". Therefore, it is not directly relevant to the brightness of the environment.

In addition, an extinction ratio refers to a ratio of light leaking out when liquid crystal is completely turned off, and it is expressed by a ratio between a state of being completely turned on and a state of being completely turned off.

DETAILED DESCRIPTION OF THE PREFERRED EMBODIMENTS

Now, the image display device of the present invention will be described in detail with reference to the preferred embodiments shown in the accompanying drawings.

Figure 1:
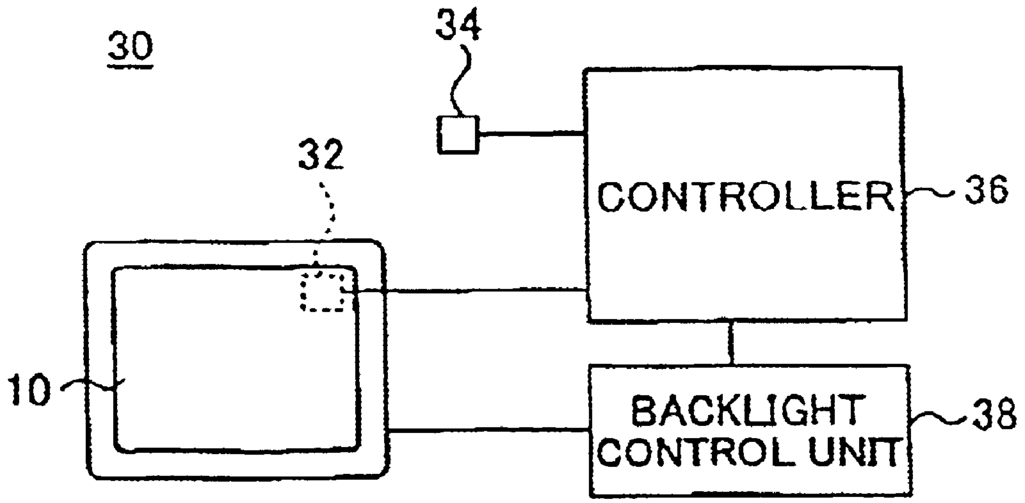
FIG. 1 is a block diagram showing a schematic constitution of an image display device according to one embodiment of the present invention.
Figure 2:
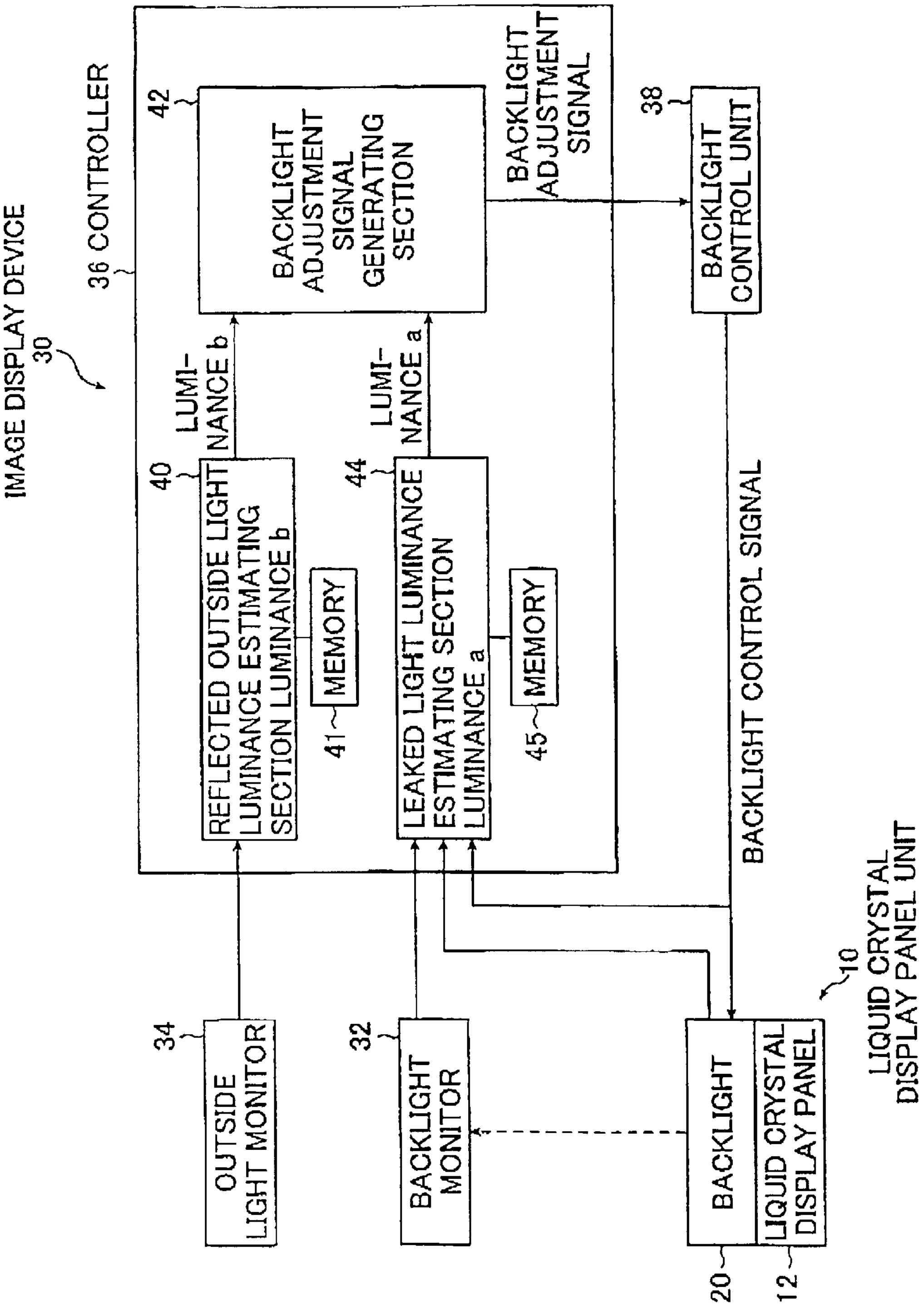
FIG. 2 is a block diagram showing a schematic constitution of an exemplary control system of the image display device shown in FIG. 1.

FIG. 1 is a block diagram showing a schematic constitution of an image display device 30 according to one embodiment of the present invention. FIG. 2 is a block diagram showing a schematic constitution of a control system including a controller 36 of the image display device according to this embodiment.

In FIGS. 1 and 2, a reference numeral 10 denotes a liquid crystal display panel unit which is a main unit of the image display device 30 according to this embodiment; a reference numeral 12 denotes a liquid crystal display panel of the liquid crystal display panel unit 10; a reference numeral 20 denotes a backlight of the liquid crystal display panel unit 10; a reference numeral 32 denotes a backlight monitor provided on a part of the backlight 20; a reference numeral 34 denotes an outside light monitor for detecting outside light of an environment where this image display device 30 is disposed; a reference numeral 36 denotes a controller for generating backlight adjustment signals for brightness adjustment of the backlight 20 based on monitor signals from the backlight monitor 32 and the outside light monitor 34; and a reference numeral 38 denotes a backlight control unit that controls output from the backlight 20 based on the backlight adjustment signals from the controller 36.

Further, in the controller 36 shown in FIG. 2, a reference numeral 40 denotes a reflected outside light luminance estimating section for estimating luminance b due to reflection of outside light on a liquid crystal screen of the liquid crystal display panel unit 10 based on outside light (environment light) as detected with the outside light monitor 34; a reference numeral 44 denotes a leaked light luminance estimating section for estimating luminance (minimum luminance) a of light leaked from the liquid crystal screen based on brightness of the backlight 20 (monitor value) as detected with the backlight monitor 32; a reference numeral 42 denotes a backlight adjustment signal generating section for generating backlight adjustment signals from the luminance a determined in the leaked light luminance estimating section 44 and the luminance b determined in the reflected outside light luminance estimating section 40; and reference numerals 41 and 45 denote memories which are connected to the reflected outside light luminance estimating section 40 and the leaked light luminance estimating section 44, respectively.

Figure 3:
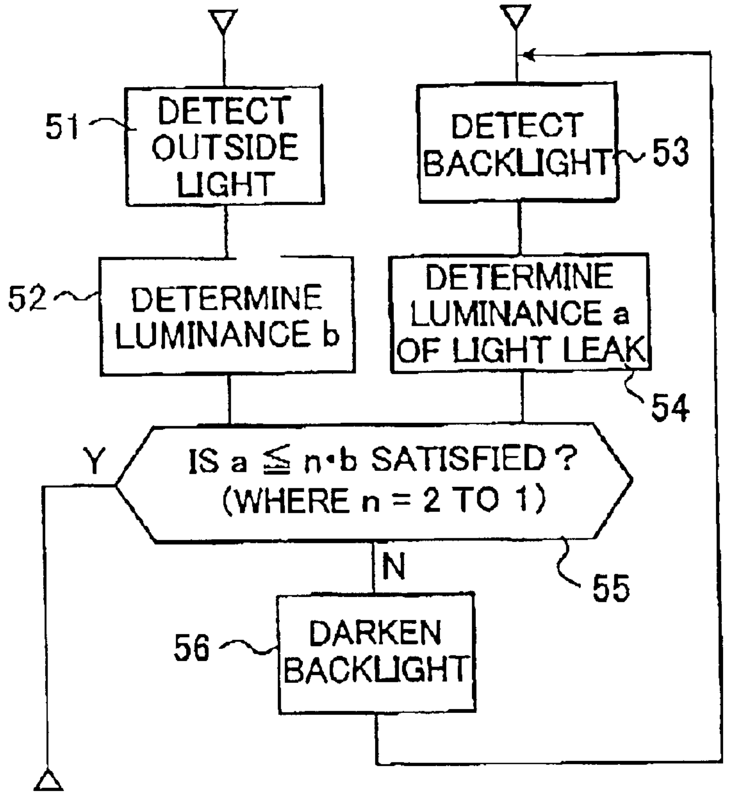
FIG. 3 is a flowchart for explaining an operation corresponding to brightness of environment light in the control system of the image display device shown in FIG. 1.

FIG. 3 is an operational flowchart for explaining an operation corresponding to brightness of environment light in the control system of the image display device 30 including the controller 36 and the backlight control unit 38. Hereinbelow, the constitution of the control system of the image display device 30 according to this embodiment and the operation in the image display device 30 corresponding to brightness of environment light will be described by reference to FIGS. 1 to 3.

The outside light monitor 34 detects brightness of outside light (Step 51 in FIG. 3). The brightness of outside light (monitor value) detected in the outside light monitor 34 is sent to the reflected outside light luminance estimating section 40 of the controller 36.

In Step 52, the reflected outside light luminance estimating section 40 reads out from the memory 41 a predetermined relation or table, which is then applied to the brightness of outside light (monitor value) sent from the outside light monitor 34 to estimate the luminance b due to reflection of outside light on the liquid crystal screen, namely the luminance b due to reflection on the liquid crystal screen which corresponds to a state of environment light (brightness) as detected with the outside light monitor 34. The relational expression or table expressing the relationship between the outside light monitor value and the luminance value b for use in estimation is preferably prepared in advance based on the relationship between the outside monitor value as detected with the outside light monitor 34 and the luminance b due to reflection of the outside light subjected to the detection with the monitor 36 on the liquid crystal screen (in a state in which the backlight 20 is turned off).

The luminance value b estimated in the reflected outside light luminance estimating section 40 is sent to the backlight adjustment signal generating section 42.

On the other hand, the backlight monitor 32 detects brightness of the backlight 20 of the liquid crystal display panel unit 10 (Step 53 in FIG. 3). The brightness of the backlight 20 (monitor value) as detected in the backlight monitor 32 is sent to the leaked light luminance estimating section 44 of the controller 36.

In Step 54, the leaked light luminance estimating section 44 reads out from the memory 45 a predetermined relation or table, which is then applied to the brightness of the backlight 20 (monitor value) sent from the backlight monitor (luminance monitor) 32 to estimate the luminance a of light leaked from the liquid crystal screen, namely luminance a of light leaked from the liquid crystal screen as defined by the luminance value of the backlight 20 and the extinction ratio of liquid crystal. The relational expression or table expressing the relationship between the backlight monitor value and the luminance value a for use in estimation is preferably prepared in advance based on the relationship between the backlight monitor value as detected with the backlight monitor 32 and the minimum luminance value (leaked light) of liquid crystal as defined by the backlight monitor value detected with the backlight monitor 32 and the extinction ratio.

The luminance value a estimated in the leaked light luminance estimating section 44 is then sent to the backlight adjustment signal generating section 42.

Next in Step 55, the backlight adjustment signal generating section 42 compares the luminance a sent from the leaked light luminance estimating section 44 with the luminance b sent from the reflected outside light luminance estimating section 40. Specifically, checking is made as to whether an inequality $a \leqq n \cdot b$ (where n is appropriately preset in a range between 2 to 1) is satisfied.

When the check in Step 55 indicates that the inequality $a \leqq n \cdot b$ is satisfied, the backlight 20 does not require brightness adjustment and can be maintained as it is (in a preset state). Accordingly, the backlight adjustment signal generating section 42 does not generate backlight adjustment signals for brightness adjustment of the backlight 20 or no backlight adjustment signals are sent to the backlight control unit 38. Thus, the backlight control unit 38 maintains the brightness of the backlight 20 in a preset state.

When the check in Step 55 indicates that the inequality $a \leqq n \cdot b$ is not satisfied, it means that such a state (the present preset state) is not favorable. Accordingly, the backlight adjustment signal generating section 42 generates a backlight adjustment signal for brightness adjustment of the backlight 20 and the thus generated backlight adjustment signal is sent to the backlight control unit 38, where brightness of the backlight 20 is changed in accordance with the backlight adjustment signal received. Thus, the backlight 20 is made darker (Step 56), and the steps shown in FIG. 3 are repeated from Step 53.

To be more specific, the backlight monitor 32 detects brightness of the backlight 20 having been changed darker (Step 53), then the leaked light luminance estimating section 44 determines again the luminance a (Step 54), and in Step 55, the backlight adjustment signal generating section 42 compares the luminance a determined in the leaked light luminance estimating section 44 with the luminance b previously determined in the reflected outside light luminance estimating section 40 (checking is made as to whether the inequality $a \leqq n \cdot b$ is satisfied).

Here, when the check in Step 55 indicates that the inequality $a \leqq n \cdot b$ is satisfied, such a state (a preset state) may be maintained. When the check in Step 55 indicates that the inequality $a \leqq n \cdot b$ is not still satisfied, the backlight 20 is made even darker, and then the above-described Steps 56 and 53 to 55 are repeated until the inequality $a \leqq n \cdot b$ becomes satisfied.

According to the above-described embodiment, it is possible to control the brightness of the backlight 20 of the image display device in a specified range relative to the environmental outside light (environment light). Accordingly, observers (mainly medical doctors) have an advantage of readily observing displayed images.

In the above-described embodiment, description was made with an example in which a predetermined relational expression, table and the like were used when determining the luminance a of the light leaked from the liquid crystal screen as defined by the luminance value of the backlight 20 and the extinction ratio of liquid crystal, from the brightness of the backlight 20 of the liquid crystal display panel unit 10 as detected by the backlight monitor 32. However, the present invention is not limited to this mode.

Figure 4A:
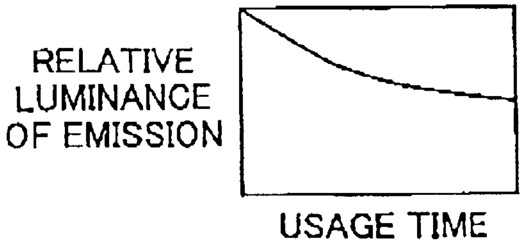
FIG. 4A is a graph showing a predetermined relationship between usage time of a backlight and luminance of emission.
Figure 4B:
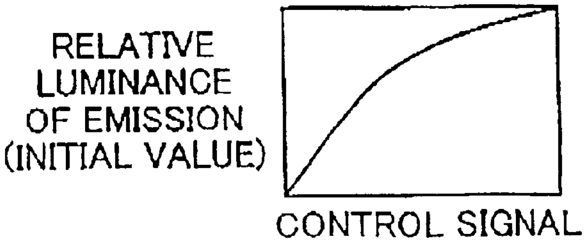
FIG. 4B is a graph showing a relationship between control signal of the backlight and luminance of emission.

FIG. 4A is a graph showing a predetermined relation between (cumulative) usage time of the backlight 20 and luminance of emission and FIG. 4B is a graph showing a predetermined relation between control signal of the backlight 20 and luminance of emission. For example, the brightness of the backlight 20 at present may be estimated based on contents of the graphs shown in FIGS. 4A and 4B so that the above-described luminance a can be estimated with reference to a preset relation between the brightness of the backlight 20 at present and light leak which is defined by the luminance value of the backlight 20 and the extinction ratio of liquid crystal.

In this case, instead of providing the backlight monitor 32 in the image display device 30 shown in FIGS. 1 and 2, the graphs shown in FIGS. 4A and 4B are stored in advance in the memory 45 of the leaked light luminance estimating section 44 in the form of relational expression or table. The leaked light luminance estimating section 44 receives the (cumulative) usage time of the backlight 20 and/or the backlight control signal from the backlight control unit 38 or the backlight 20 and at the same time, reads out a necessary graph in the form of relational expression or table from the memory 45 to thereby determine the brightness (luminance of emission) of the backlight 20 at present.

In this process, the leaked light luminance estimating section 44 uses the thus determined brightness (luminance of emission) of the backlight 20 at present instead of the monitor value (brightness) detected with the backlight monitor 32 to thereby calculate the luminance (minimum luminance of liquid crystal) a of light leaked from the liquid crystal screen based on the luminance of emission of the backlight 20 and the extinction ratio of liquid crystal.

In the above-described embodiment, description was made with an example in which a predetermined relational expression, table and the like were used when determining the luminance b due to reflection on the liquid crystal screen corresponding to the state of environment light, from the brightness of outside light detected by the outside light monitor 34. However, the present invention is not limited to this mode.

For instance, it is also an effective way to determine the luminance b due to reflection on the liquid crystal screen corresponding to the predetermined brightness of the environment light, based on the brightness of the backlight 20 as estimated in the above steps and the result of the detection made with a detector for brightness of environment light.

In the various embodiments described above, when it is indicated that the inequality $a \leqq n \cdot b$ (n is 2 to 1) is satisfied between the luminance a of the light leaked from the liquid crystal screen and the luminance b due to reflection on the liquid crystal screen corresponding to the brightness of environment light, the backlight 20 is not subjected to brightness adjustment but is maintained as it is in a preset state. However, the present invention is not limited to this process. Since the luminance of the backlight 20 is desirably made as high as possible, the brightness of the backlight 20 may be adjusted by the controller 36 or the backlight control unit 38 so as to be 70% or more of the maximum luminance of the backlight 20 as long as the inequality $a \leqq n \cdot b$ is satisfied.

Note that the above-described embodiments are merely examples of the present invention, and it is needless to say that the present invention will not be limited to these examples.

As has been described in detail, the present invention has a significant advantage of realizing an image display device which utilizes a liquid crystal display panel unit and which ensures that displayed images can be clearly seen regardless of brightness of environment light (surrounding light).

What is claimed is:

1. An image display device, comprising:

a liquid crystal display device having a liquid crystal panel and a backlight; and a backlight controller for allowing the backlight of the liquid crystal display device to be bright when environment light is bright, and allowing the backlight to be dark when the environment light is dark such that light leak, which is defined by an extinction ratio of liquid crystal, will not grow more than a specified degree, wherein said backlight controller comprises:

a first detector for detecting brightness of the environment light; and a brightness controller for controlling brightness of the backlight of the liquid crystal device, and wherein said backlight controller adjusts the brightness of the backlight corresponding to the brightness of the environment light, and wherein said brightness controller comprises:

a second detector for detecting a luminance value of the backlight, being provided at the backlight;

a device for estimating a first luminance value of the light leak of a liquid crystal screen of the liquid crystal display device, with a preset relation between the luminance value of the backlight and the light leak defined by the extinction ratio of the liquid crystal; and a device for determining a second luminance value accrued by reflection of the liquid crystal screen corresponding to the brightness of the environment light detected by said first detector, based on a predetermined relation between the brightness of the environment light and the second luminance corresponding thereto that is accrued by reflection of the liquid crystal screen; wherein said brightness controller controls the brightness of the backlight such that a ratio of the first luminance value to the second luminance value is not more than 2.

2. The image display device according to claim 1, wherein said brightness controller controls the brightness of the backlight such that the brightness of the backlight is 70% or more of a maximum luminance of the backlight in a range in which the ratio of the first luminance value to the second luminance value is not more than 2.

3. The image display device according to claim 1, wherein said brightness controller controls the brightness of the backlight such that said first luminance value is equal to or less than said second luminance value.

4. The image display device according to claim 1, wherein said brightness controller controls the brightness of the backlight such that the brightness of the backlight is 70% or more of a maximum luminance of the backlight in a range in which the first luminance value is equal to or less that the second luminance value.

5. The image display device of claim 1, wherein said backlight controller controls said backlight so that light leak will not grow more than a specified degree.

6. An image display device, comprising:

a liquid crystal display device having a liquid crystal panel and a backlight; and a backlight controller for allowing the backlight of the liquid crystal display device to be bright when environment light is bright, and allowing the backlight to be dark when the environment light is dark such that light leak, which is defined by an extinction ratio of liquid crystal, will not grow more than a specified degree, wherein said backlight controller comprises:

a first detector for detecting brightness of the environment light; and a brightness controller for controlling brightness of the backlight of the liquid crystal display device, and wherein said backlight controller adjusts the brightness of the backlight corresponding to the brightness of the environment light, and wherein said brightness controller comprises:

a device for estimating a first luminance value of the light leak of a liquid crystal screen of the liquid crystal display device from current brightness of the backlight which is estimated based on a predetermined relation between usage time of the backlight and luminance of emission of the backlight and a predetermined relation between a control signal of the backlight and the luminance of the emission of the backlight, with a preset relation between the luminance value of the backlight and the light leak that is defined by the extinction ratio of the liquid crystal; and a device for determining a second luminance value accrued by reflection of the liquid crystal screen corresponding to the brightness of the environment light detected by said first detector, based on a predetermined relation between the brightness of the environment light and the second luminance corresponding thereto that is accrued by reflection of the liquid crystal screen; wherein said brightness controller controls the brightness of the backlight such that a ratio of the first luminance value to the second luminance value is not more than 2.

7. The image display device according to claim 6, wherein said brightness controller controls the brightness of the backlight such that the brightness of the backlight is 70% or more of a maximum luminance of the backlight in a range in which the ratio of the first luminance value to the second luminance value is not more than 2.

8. The image display device according to claim 6, wherein said brightness controller controls the brightness of the backlight such that said first luminance value is equal to or less than said second luminance value.

9. The image display device according to claim 6, wherein said brightness controller controls the brightness of the backlight such that the brightness of the backlight is 70% or more of a maximum luminance of the backlight in a range in which the first luminance value is equal to or less than the second luminance value.

10. The image display device of claims 6, wherein said backlight controller controls said backlight so that light leak will not grow more than a specified degree.

* * * * *